United States Patent

[19]

Jenness

[11] 4,032,199
[45] June 28, 1977

[54] APPARATUS FOR EQUALIZING RADIAL LOAD ON PLURALITY OF PIVOTED BEARING PADS

[75] Inventor: Raymond C. Jenness, Milwaukee, Wis.

[73] Assignee: Allis-Chalmers Corporation, Milwaukee, Wis.

[22] Filed: Apr. 30, 1976

[21] Appl. No.: 682,075

Related U.S. Application Data

[62] Division of Ser. No. 508,983, Sept. 25, 1974, Pat. No. 3,918,770.

[52] U.S. Cl. .................................. 308/73
[51] Int. Cl.² .......................... F16C 17/06
[58] Field of Search .................. 308/2 R, 72, 73

[56] References Cited

UNITED STATES PATENTS

| | | | |
|---|---|---|---|
| 3,093,426 | 6/1963 | Cornford | 308/73 |
| 3,887,245 | 6/1975 | Rouch | 308/73 X |
| 3,918,770 | 11/1975 | Rouch | 308/2 R |

FOREIGN PATENTS OR APPLICATIONS 330,884  11/1921  Germany .................. 308/73

*Primary Examiner*—Joseph F. Peters, Jr.
*Assistant Examiner*—Gene A. Church
*Attorney, Agent, or Firm*—Robert C. Sullivan

[57] ABSTRACT

An apparatus for equalizing the radial load on the pivoted bearing pads of a journal bearing which comprises in excess of two pivoted bearing pads, say four or five pivoted bearing pads, for example. The journal bearing includes two bearing pads located in a generally central region relative to the span of the plurality of bearing pads in a circumferential direction, with the corresponding supports for the two bearing pads being radially fixed in position, and with the remaining bearing pads being mounted on supports which are radially adjustable. A mechanical adjusting means is pivoted for separately radially adjusting the support for each of the radially adjustable bearing pads, whereby to correspondingly, radially adjust the corresponding pivoted bearing pads. A separate source of high pressure oil is connected to the interface between each bearing pad and the journal, and a separate hydraulic pressure gauge is provided for each of said interfaces. The supports for the respective radially adjustable bearing pads are radially adjusted until an equalization is reached between the high pressure oil film pressures at the interfaces between all of the respective bearing pads and the rotating journal which is indicative that all of the bearing pads are carrying an equal radial load. It may be desirable under certain conditions to purposely provide a differential pressure setting for certain of the bearing pads at the time of initial adjustment whereby to obtain substantial equalization of radial load on all the bearing pads after operational equilibrium is reached.

10 Claims, 5 Drawing Figures

APPARATUS FOR EQUALIZING RADIAL LOAD ON PLURALITY OF PIVOTED BEARING PADS

This is a division, of application Serial No. 508,983 filed Sept. 25, 1974.

BACKGROUND OF THE INVENTION

1. Field of the Invention

This invention relates to journal bearings and more particularly to a journal bearing which includes both radially fixed and radially adjustable pivoted bearing pads, and to an apparatus for equalizing the radial load on a plurality of pivoted bearing pads.

The apparatus of the invention is applicable principally, although not necessarily exclusively, to the initial installation of the rotating structure or journalled member upon the bearing pads to insure equal distribution of the radial load on the plurality of bearing pads.

2. Description of the Prior Art

It has been known in the prior art in journal bearings of the type having pivotally movable bearing pads to provide means for radially adjusting the supports on which the individual bearing pads rest whereby to equalize the load carried by the respective bearing pads. The prior art arrangement of this type of which I am aware utilizes an individual radially extending adjusting rod for each pivoted bearing pad support by means of which the support for each of the plurality of pivoted bearing pads of the aforementioned prior art construction is individually radially adjustable. This aforementioned prior art construction is in my opinion unsatisfactory in several respects, including the fact that it is difficult to assemble.

STATEMENT OF THE INVENTION

Accordingly, it is an object of the invention to provide a journal bearing of the pivoted pad type including a multiplicity of bearing pads, and in which only certain bearing pads of the multiplicity have associated with them individual radial adjusting mechanisms, rather than requiring an individual radial adjusting mechanism for each bearing pad as in the prior art.

It is a further object of the invention to provide a journal bearing of the pivoted pad type including means for radially adjusting certain of the pivoted bearing pads, and in which the radial adjusting arrangement is easier to construct and assemble than prior art arrangements for this purpose.

It is another object of the present invention to provide a pivoted pad journal bearing in which in the case of the total number of bearing pads being an even number, the supports for the two most centrally located bearing pads (relative to the span of the bearing pads in the circumferential dimension) are radially fixed in position, while the remainder of the multiplicity of bearing pads and the respective supports therefor are radially adjustable by means of individual radial adjusting mechanisms associated with the supports for the respective bearing pads.

It is another object of the present invention to provide a pivoted pad journal bearing in which in the case of total number of bearing pads being an odd number (5, 7, etc.) the support for the lowermost and most centrally located bearing pad is radially adjustable, while the supports for the two bearing pads respectively lying symmetrically contiguous opposite sides of said centrally located bearing pad are radially fixed, with the remainder of the multiplicity of bearing pads and the respective supports therefor being radially adjustable by means of individual radial adjustment mechanisms associated with the supports for the respective bearing pads.

It is another object of the invention to provide an improved apparatus for equalizing the radial load on a plurality of pivoted bearing pads.

It is another object of the invention to provide an apparatus for obtaining a predetermined distribution of radial load upon the individual bearing pads of a journal bearing having a multiplicity of bearing pads.

In achievement of these objectives, there is provided in accordance with an embodiment of the invention an apparatus for equalizing the radial load on the pivoted bearing pads of a journal bearing which comprises in excess of two pivoted bearing pads, say four or five pivoted bearing pads, for example.

In a preferred embodiment, the total number of bearing pads is an even number (4, 6, etc.) and the two centrally located bearing pads relative to the span of the plurality of bearing pads in a circumferential direction are radially fixed in position. The remaining bearing pads are mounted on supports which are radially adjustable. The journal member is first mounted upon the two centrally located radially fixed bearing pads, with the radially adjustable bearing pads being retracted in a radially outward direction so that they do not initially support any of the radial load imposed on the bearing structure by the journalled member. A mechanical adjusting means is provided for separately radially adjusting the support for each of the radially adjustable bearing pads, whereby to correspondingly radially adjust the corresponding pivoted bearing pads. As the radially adjustable bearing pads are radially adjusted inwardly toward the journal they begin to carry some of the radial load imposed by the journal. The supports for the respective radially adjustable bearing pads are radially adjusted until an equalization is reached between the high pressure oil film pressures at the interfaces between all of the respective bearing pads and the rotating journal (i.e., the oil film pressures at all of the respective interfaces are substantially the same). This equalization of oil film pressures at the respective bearing pad journal interfaces is indicative that all of the bearing pads are carrying an equal radial load.

Instead of equalizing the oil pressures at the interfaces between all of the bearing pads and the journal, it may be desirable under certain conditions to purposely provide a differential pressure setting for certain of the bearing pads at the time of initial adjustment to allow for anticipated operational changes which may occur after operational equilibrium conditions are reached, whereby to obtain substantial equalization of radial load on all the bearing pads after operational equilibrium is reached.

When the total number of bearing pads is an odd number (5, 7, etc.), the support surface for the lowermost and centrally located bearing pad is radially adjustable, and two bearing pads symmetrically located about the lowermost bearing pad and having radially fixed support surfaces are used, one lying contiguous the lowermost centrally located bearing pad on either side thereof. The remaining bearing pads are radially adjustable.

Further objects and advantages of the invention will become apparent through the following description taken in conjunction with the accompanying drawings in which:

DESCRIPTION OF PREFERRED EMBODIMENT

Figure 1:
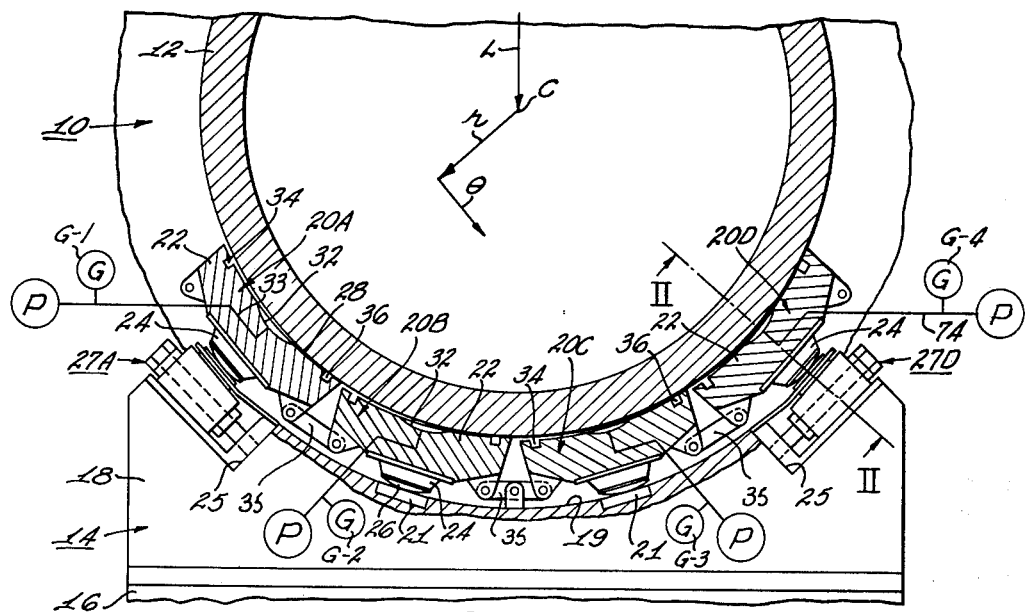
FIG. 1 is a view showing a rotary grinding mill journalled for rotation in a bearing structure in accordance with the invention.
Figure 2:
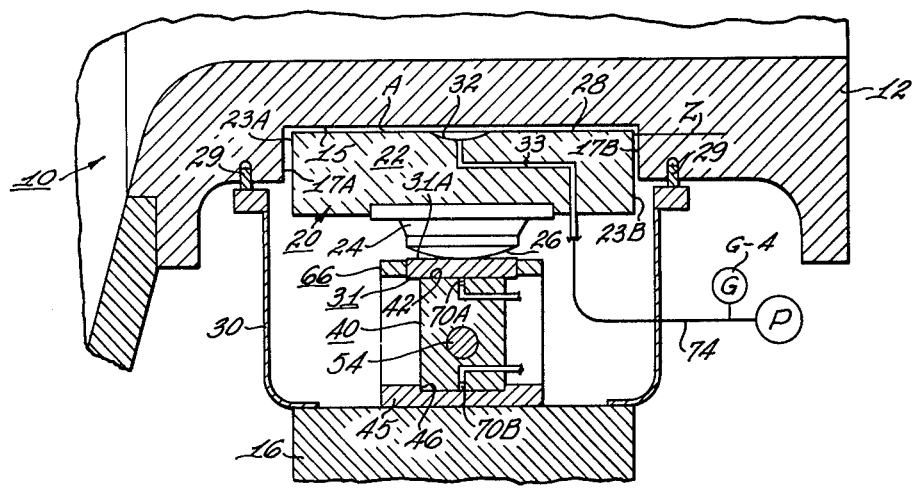
FIG. 2 is a view in axial section taken along line II—II of FIG. 1.

Referring now to the drawings and more particularly to FIGS. 1 and 2, there is shown a rotary grinding mill generally indicated at 10 of the type used for grinding mineral ore or the like and having a hollow trunnion 12 which is journalled for rotation in a bearing structure generally indicated at 14. The trunnion 12 may be either the inlet trunnion or the discharge trunnion of the grinding mill. A bearing arrangement generally similar to that to be described herein is preferably provided at each of the opposite ends of the mill for supporting the respective inlet and discharge trunnions of the mill.

The bearing structure generally indicated at 14 comprises a normally vertical bearing pedestal 16 on the upper surface of which is suitably mounted an upwardly open bearing support 18. Bearing support 18 may also be integral with bearing pedestal 16. The portion of the upper surface 19 of bearing support 18 which underlies the two most centrally located (relative to the circumferential dimension) bearing pads 20B and 20C to be described, may be an arcuate portion of a cylinder whose radius is drawn substantially from the longitudinal axis C of trunnion 12. At circumferentially spaced intervals, surface 19 of bearing support 18 is recessed to receive inserts 21 of a suitable supporting material such as high grade hard tool steel for supporting the two respective centrally located bearing pads 20B and 20C. The bearing support 18 is recessed as indicated at 25 in the portions thereof underlying the bearing pads 20A andd 20D to receive the adjusting device shown in FIGS. 3 and 4. It will be noted that in the particular embodiment shown, the bearing support 18 only extends beneath the lower portion of the periphery of trunnion 12, the arcuate extent of bearing support 18 in the illustrated embodiment being less than 180°, as is common practice in the supporting arrangements for rotating trunnions of grinding mills. A suitable housing 30 is mounted on the upper end of bearing pedestal 16 in enclosing relation to the upper portion of the bearing structure to prevent contamination and loss of bearing lubricant. The upper end of housing 30 supports suitable seals 29 which engage the periphery of the rotating trunnion 12.

The journal bearing comprises a plurality of pivoted bearing pads (in the case of the illustrated embodiment, four, although a larger number of bearing pads, such as six, for example, might be used) each respectively generally indicated at 20 and specifically designated as 20A, 20B, 20C, 20D, which underlie the lower surface of trunnion 12 in supporting relation to the trunnion. Bearing pads 20 are spaced from each other a short distance circumferentially of trunnion 12. Each bearing pad 20 comprises a bearing pad portion 22 which extends circumferentially and axially of the trunnion 12 in underlying supporting relation to the trunnion.

Each bearing pad 20 has suitably attached thereto or integral therewith a centrally located pivotal support portion 24. The radially outer surface 26 of each pivotal support portion 24 is of spherical contour or of other suitable convex contour which permits the respective bearing pads 20 to undergo small rotations about at least two axes and preferably about all three axes indicated at $r$ (radial), $\theta$ (circumferential) and $z$ (axial) in FIGS. 1 and 2, as dictated by the oil film formed at interface A between the radially inner surface 28 of pad portion 22 and the radially outer cooperating surface 15 of the trunnion. The radially outer spherical or convex surface 26 of the pivotal support portion 24 of the respective bearing pads 20B, 20C is adapted to bear against a corresponding one of the inserts 21 in arcuate surface 19 of bearing support 18, while the surface 26 of the pivotal support portion 24 of the adjustable bearing pads 20A, 20D bears against the surface 31A of the radially adjustable support plate 31 to be described.

Contiguous bearing pads such as 20A–20B, etc., are pivotally connected to each other by links 35 to restrain the bearing pads from movement from an approximate required location, while still permitting any necessary pivotal movement of the respective bearing pads. This restraining arrangement is disclosed in copending U.S. patent application Ser. No. 478,736, (now U.S. Pat. No. 3,918,770 which issued Nov. 11, 1975) of Keith M. Rouch, filed June 12, 1974, and assigned to the same assignee as the present application.

As best seen in FIG. 2, the outer periphery of the journal or trunnion 12 is provided with an axially extending and circumferentially extending countersunk surface 15 which is adapted to radially overlie the bearing surface 28 of each bearing pad 20, and the countersunk surface 15 on the rotating journal 12 is bounded at the opposite axial ends thereof by thrust shoulders on journal 12, respectively indicated at 17A and 17B, which engage thrust shoulders 23A, 23B on the respective bearing pads 20.

The oil pressure developed in the lubricating oil film at the interface between the radially inner bearing surface 28 of each respective bearing pad portion 22 and the radially outer surface 15 of trunnion 12 supports the load L and during normal running operation of the rotary grinding mill is due to hydrodynamic action of the lubricating fluid (due to relative rotation between surfaces 28 and 15), the low pressure oil for hydrodynamic lubrication being supplied at oil distribution grooves 34 and 36 in the bearing surface 28 of each bearing pad. Oil distribution grooves 34 and 36 are suitably connected to a source of low pressure oil, such as, for example, a pump having an output pressure in the approximate range 15 to 100 pounds per square inch. Alternatively, the oil film pressure between the bearing and journal may be due to hydrostatic operation of lubricant supplied by a relatively high pressure external pump P, only at certain times during the operation of the grinding mill, particularly during the start-up, inching, and shut-down operation of the grinding mill, and also during the bearing pad radial adjustment procedure in accordance with the present invention, in order to determine when equalization of radial load on the plurality of bearing pads has been achieved. High pressure oil for hydrostatic operation may be supplied through centrally located discharge opening 32 (FIG. 2) in bearing face 28 of the bearing pad 20. Discharge opening 32 is connected by a suitable internal passage 33 in pad 20 to the source P of high pressure oil. The high pressure oil may be supplied, for example, at a pressure in the range of from approximately 500 pounds per square inch to approximately 3500 pounds per square inch.

Figure 4:
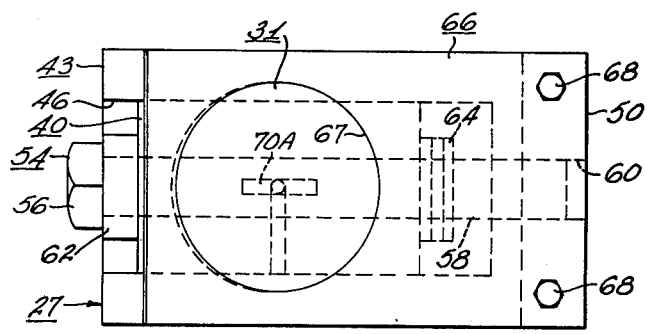
FIG. 4 is a top plan view of the structure shown in FIG. 3.
Figure 3:
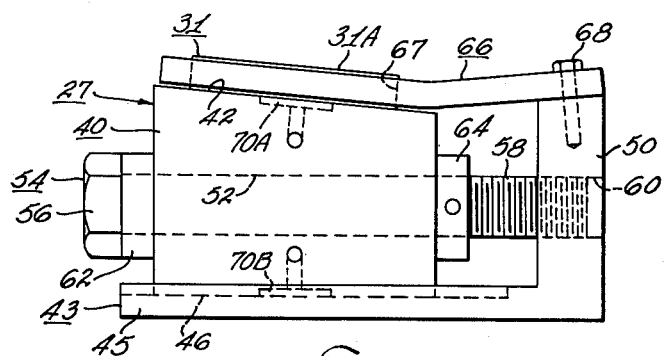
FIG. 3 is an elevation view of the support for one of the radially adjustable pivoted bearing pads and further showing the wedge-like adjusting means used to provide radial adjustment of the support.

Referring now to FIGS. 3 and 4, which show details of the adjusting device used for radially adjusting the bearing pads 20A and 20D, the adjusting device being generally indicated at 27, but specifically indicated at 27A for the adjusting device for bearing pad 20A and at 27D for the adjusting device for bearing pad 20D. The radial adjusting device includes a circular support member or plate generally indicated at 31 which lies upon the upper inclined surface 42 of a linearly movable wedge member generally indicated at 40.

Support plate 31 serves as a support for the corresponding radially adjustable pivoted bearing pad 20A or 20D. The radial adjusting device 27 is so oriented that the radially inner or support surface 31A of support plate 31 is substantially perpendicular to a radius drawn from the axis of rotation of the journalled member, in this case trunnion 12. Wedge member 40 is guided for linear movement by a track 46 in base member 45 of a supporting frame generally indicated at 43. Frame 43 also includes an arm 50 which extends at right angles to the base portion 45 of frame 43. Wedge 40 has a longitudinal passage 52 therethrough which receives the unthreaded portion of an elongated bolt generally indicated at 54. Bolt 54 includes a hex head 56 by means of which the bolt may be turned, and a threaded end included at 58 which is threadedly received in a threaded passage 60 in arm 50 of support frame 43. Bolt 54 also carries a thrust washer 62 between the hex head 56 of the bolt and the facing surface of wedge member 40 and a second thrust washer 64 is pinned to the stud portion of bolt 54 contiguous the righthand end relative to the view of FIG. 3 of wedge 40. Thus, wedge 40 is confined on the stud portion of bolt 54 between the two thrust washers 62 and 64. It can be seen that if the bolt 54 is rotated to advance the bolt to the right, for example, relative to the view of FIG. 3, to cause the threads on the bolt to engage the threads in threaded portion 60 of support arm 50, that wedge 40 will move linearly to the right relative to FIG. 3 with bolt 54, and assuming that the wedge moves to the right relative to the view of FIG. 3, the support member or plate 31 will be moved upwardly relative to FIG. 3 or in a radially inward direction relative to the view of FIG. 1. A guide member or "keeper" generally indicated at 66 is provided for confining support plate 31, keeper 66 being secured by bolts 68 to the upper end of arm 50 of support frame 43. Keeper 66 is provided with a circular opening slightly larger in diameter than the diameter of support plate 31 whereby support plate 31 will be confined to move radially inwardly or outwardly relative to the grinding mill axis, within the confines of the bounding opening 67 of "keeper" 66.

To facilitate the sliding movement of wedge 40, lubricant distribution grooves 70A and 70B are provided in the surfaces of wedge 40 which respectively lie contiguous the normally radially outer surface of support plate 31 and contiguous the surface of track 46. A suitable lubricant such as oil may be introduced to distribution grooves 70A and 70B, whereby to facilitate the sliding movement of wedge 40.

In using the radial adjusting arrangement of the invention, the journalled member such as trunnion 12 of a rotary grinding mill is set down on the bearings supporting the opposite axial ends of the journalled member (i.e., on the trunnion bearings at the feed end and at the discharge end of the grinding mill, for example). Since the adjusting procedure at both ends is the same, the adjustment at only one end will be described. During the adjusting procedure to be described, the journal is not rotating.

When the journalled member is initially set down on the bearing, the journal or trunnion is set down on and preferably supported by only two radially fixed centrally located bearing pads, namely bearing pads 20B and 20C. At this time, all of the remaining and radially adjustable bearing pads 20A and 20D and their associated radial adjusting devices 27A and 27D are in position, but are preferably radially retracted sufficiently that bearing pads 20A and 20D do not initially support any of the radial load imposed on the bearing structure by the journalled member. In other words, when the journalled member is initially mounted on the bearing structure, the two centrally located bearing pads preferably support the total radial load. Under this initial condition just described, the total radial load on the bearing structure would be substantially equally divided between the two centrally located bearing pads 20B and 20C.

While at the time of the initial installation of the journal on the bearing structure, the radially adjustable bearing pads 20A, 20D are preferably radially retracted sufficiently that they do not assume any radial load, it is also within the scope of the invention that at the time of initial installation of the journal that the radially adjustable bearing pads be so radially positioned that they assume radial load.

The radial adjusting devices 27A and 27D are then operated by turning the respective bolts 54 by the hex head 56 thereof to cause the threaded end 58 of each bolt to advance along the threaded portion 60 of arm 50. This moves wedge 40 to the right, relative to the view of FIG. 3, causing support plate 31 and the corresponding bearing pad 20A or 20D to move radially inwardly relative to the axis of rotation of journal or trunnion 12.

As the support plates 31 associated with the respective radial adjusting means 27 and their associated bearing pads begin to move radially inwardly from their initially radially outwardly retracted position, the respective bearing pads 20A and 20D begin to assume more of the radial load imposed by the journalled member.

During the radial adjustment process, a flow of high pressure oil is supplied to the orifice 32 at the interface A between the bearing pad surface 28 of each bearing pad and the journal surface 15 by means of internal passage 33 in the bearing pad and a conduit 74 connected to the output of high pressure pump P. The flow of high pressure oil exhausts from interface A to a suitable sump (not shown). The high pressure pump P is preferably a constant volume, positive displacement piston pump. A separate pump P is connected to the orifice 32 of each bearing pad. Alternatively, a single multi-cylinder pump could be provided, in which each cylinder and associated piston is hydraulically equivalent to a separate constant volume, positive displacement piston pump which is substantially hydraulically independent of the other cylinders of the multicylinder pump. In this alternative case, a separate cylinder is connected to orifice 32 of each bearing pad 20A, 20B, 20C and 20D.

The output conduit 74 of each high pressure pump P has an oil pressure gauge G associated therewith and the gauge reading is indicative of the oil pressure at the interface A between bearing pad surface 28 of the particular bearing pad and journal surface 15. The oil pressure reading of any gauge G is indicative of the radial load being carried by the corresponding bearing pad. Thus, to equalize the load carried by the respective bearing pads 20A, 20B, 20C, 20D, the radially adjustable bearing pads 20A and 20D are mechanically radially adjusted by their corresponding radial adjusting means 27A and 27D until the oil pressure readings are substantially equalized on all four pressure gauges G-1, G-2, G-3, G-4, which are respectively associated with bearing pads 20A, 20B, 20C, 20D. This will indicate that all four bearing pads 20A, 20B, 20C, 20D, are equally sharing the radial load imposed on the bearing structure by the journalled member.

For example, when the journalled member is initially placed on the two centrally located bearing pads 20B and 20C, the pressure gauges G-2 and G-3 associated with the radially fixed bearing pads 20B and 20C might each have a pressure reading of 2500 pounds per square inch. When the radial adjustment of bearing pads 20A and 20D has been completed, the pressure reading of each of the gauges G-1, G-2, G-3, G-4 associated with the respective bearing pads 20A, 20B, 20C, 20D would now each read somewhat more than 1250 pounds per square inch because of the vectorial force relationships involved. The four bearing pads 20A, 20B, 20C, 20D now assume equal radial loads.

During the radial adjustment process hereinbefore described, a flow of high pressure oil is preferably conducted to the interface A between each respective bearing pad (both radially fixed and radially adjustable) and the journal, as previously explained. In accordance with this procedure just described, a high pressure oil flow is present when any given radial adjustment is being made. However, it is also within the scope of the invention to employ a modified "trial and error" procedure which would proceed in the following manner: (a) make a radial adjustment on the support surface of a given radially adjustable bearing pad without a flow of high pressure oil to the corresponding interface A; (b) energize the high pressure lubrication system corresponding to the given radially adjustable bearing pad and take a pressure reading on the corresponding gauge G to determine the relative radial load being assumed by the given bearing pad; (c) repeat steps (a) and (b) until an appropriate pressure reading is obtained.

In order to establish a fixed radial setting of the support surface 21 for the radially fixed bearing pads 20B, 20C, (FIG. 1), it may be desirable to position steel shims under one or both of the support surface 21 for these respective bearing pads 20B, 20C. Such shimming may be used, for example, to adjust the location of the axial centerline of the mill. Any radial adjustment of the support surfaces for the radially adjustable bearing pads 20A, 20D is made subsequently to the establishment of the fixed reference radial setting on the two radially fixed bearing pads 20B, 20C.

The bearing pad adjustment procedure has been described assuming constant conditions throughout operation of the bearing. However, instead of equalizing the oil pressures at the interfaces between all of the bearing pads and the journal, it may be desirable under certain conditions to purposely provide a differential pressure setting for certain of the bearing pads at the time of initial adjustment to allow for anticipated operational changes which may occur after operational equilibrium conditions are reached, whereby to obtain substantial equalization of radial load on all of the bearing pads after operational equilibrium is reached.

Figure 5:
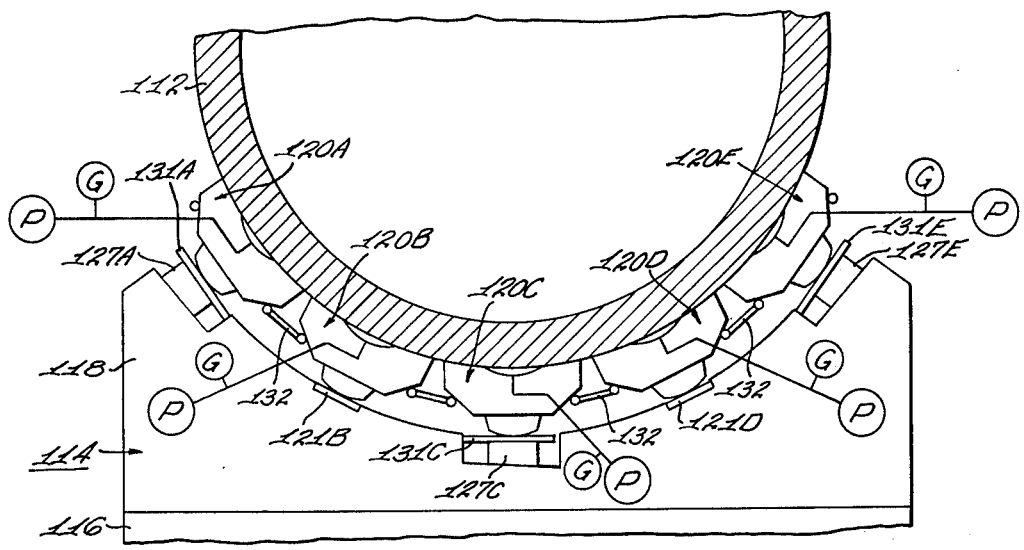
FIG. 5 is a diagrammatic view showing the relative location of the radially fixed and the radially adjustable bearing pads where the total number of bearing pads is an odd number such as 5, 7, etc.

Referring now to FIG. 5, there is shown somewhat schematically the arrangement of the bearing pads which would be used if the total number of bearing pads were an odd number such as five. Thus, in the view of FIG. 5 it will be noted that there are five bearing pads respectively designated as 120A, 120B, 120C, 120D and 120E as viewed from left to right in FIG. 5. The bearing pads as described form part of a bearing structure generally indicated at 114 which includes a bearing support 118 mounted on or integral with a bearing pedestal 116. The support structure for the bearing pads of FIG. 5 is similar to the bearing support structure described in connection with the embodiment of FIGS. 1–4, inclusive, and will not be described in detail again. The bearing pads 120A–120E, inclusive, of FIG. 5 support a trunnion 112 for rotation.

In the embodiment of FIG. 5, the lowermost and most centrally located bearing pad 120C is radially adjustable and rests on a support plate 131C which is radially adjustable by means of a linearly movable wedge device 127C similar to the wedge device 27 shown and described in connection with FIG. 3 of the drawings. Bearing pad 120C lies substantially in alignment with the vertical axis of symmetry of the bearing.

The bearing pads 120B and 120D are radially fixed in the same manner as described in connection with bearing pads 20B and 20C in FIG. 1 and respectively rest on inserts 121B and 121D, which are suitably mounted in the upper surface of bearing support 118. The radially fixed bearing pads 120B and 120D are symmetrically positioned on opposite sides of the radially adjustable centrally located bearing pad 120C.

Similarly, the bearing pads 120A and 120E which lie at the opposite ends of the total circumferential span of the bearing pads are radially adjustable. The radially adjustable bearing pad 120A rests on a support plate 131A which is radially movable by means of the linearly movable wedge device 127A; and similarly, the radially adjustable bearing pad 120E rests on a support plate 131E which is radially movable by means of the linearly movable wedge means 127E in the same manner as described in connection with the wedge device 27 and support plate 31 of FIG. 3.

Thus it will be seen that when an odd number of bearing pads is used such as five or seven, for example, the lowermost and most centrally located bearing pad is radially adjustable and the two radially fixed bearing pads are symmetrically positioned contiguous and on either side of the lowermost centrally located radially adjustable bearing pad. The remaining bearing pads such as 120A and 120E are radially adjustable. In the embodiment of FIG. 5, the plurality of bearing pads 120A-120E, inclusive, are pivotally connected together by a link means 132 in the same manner as described in connection with the embodiment of FIG. 1.

As in the embodiment of FIG. 1, high pressure hydraulic fluid is supplied in the embodiment of FIG. 5 by a separate pump P to the interface between each respective bearing pad and the journal; and a gauge G is connected in the pump line to the interface to read the oil film pressure at each interface.

The procedures followed to obtain equalization of the radial load carried by the bearing pads is the same as described in connection with the embodiment of FIGS. 1 to 4 and will not be described again in detail except to point out that when the journal is initially placed upon the bearing structure, the radially adjustable bearing pads 120A, 120C, 120E, are preferably radially retracted sufficiently that they do not assume any of the radial load, as explained in connection with the embodiment shown in FIG. 1. However, as in the embodiment of FIG. 1, it is also within the scope of the invention that at the time of the initial installation of the journal, the radially adjustable bearing pads be so radially positioned that they assume radial load.

The radially adjustable bearing pads are radially adjusted in the same manner as previously described in connection with the embodiment of FIG. 1 to obtain equalization of the oil pressure readings at the interfaces between the respective bearing pads and the journal, which indicates that all the bearing pads are assuming equal radial loads as in the embodiment of FIG. 1. It is also within the scope of the invention to purposely provide a differential oil pressure setting for certain of the bearing pads at the time of initial installation to allow for anticipated operational changes which may occur after operational equilibrium conditions are reached.

From the foregoing detailed description of the invention it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. In combination, a journal bearing adapted to support a journal for rotation and comprising an even number of bearing pads in excess of two spaced from each other circumferentially of the journal being supported and lying beneath the circumference of the journal and symmetrically positioned about the vertical axis of the bearing, each of said bearing pads being adapted to pivot on a corresponding support surface lying radially outwardly of the respective bearing pads, two of said bearing pads being located substantially centrally of the circumferential span of the plurality of bearing pads, the support surfaces for said two centrally located bearing pads being substantially radially fixed, means for separately radially adjusting the respective support surfaces for the remaining bearing pads whereby to adjust the relative radial load carried by all of said bearing pads, a separate source of hydraulic pressure corresponding to each of the respective bearing pads and connected to the interface between the respective corresponding bearing pads and said journal, and separate hydraulic pressure gauge means corresponding to each respective bearing pad for indicating the hydraulic pressure at each respective corresponding interface whereby to indicate the relative radial loads assumed by the various bearing pads including the two centrally located bearing pads.

2. The combination defined in claim 1 in which the hydraulic fluid is oil.

3. The combination defined in claim 1 in which each said separate source of hydraulic pressure is a constant volume, positive displacement piston pump.

4. The combination defined in claim 1 in which the separate source of hydraulic pressure corresponding to each of the respective bearing pads is provided by a single multi-cylinder pump of the type in which each cylinder of the pump is substantially hydraulically independent of the other cylinders of the pump, and in which each cylinder of the pump is hydraulically connected to a different corresponding interface between a corresponding bearing pad and said journal.

5. A journal bearing adapted to support a journal for rotation and comprising an odd number of bearing pads in excess of two spaced apart from each other circumferentially of the journal being supported and lying beneath the circumference of the journal, each of said bearing pads being adapted to pivot on a corresponding support surface lying radially outwardly of the respective bearing pads, one of said bearing pads being located substantially centrally of the circumferential span of the plurality of bearing pads and lying substantially in alignment with the vertical axis of symmetry of the bearing, the support surface for said one bearing pad being radially adjustable, means for radially adjusting the support surface for said one bearing pad, said odd number of bearing pads including a pair of additional bearing pads respectively symmetrically positioned on opposite circumferential sides of said one bearing pad, the support surfaces for said additional bearing pads being radially fixed, a separate source of hydraulic pressure corresponding to each of the respective bearing pads and connected to the interface between the respective corresponding bearing pads and said journal, and separate hydraulic pressure gauge means for indicating the hydraulic pressure at each respective corresponding interface whereby to indicate the relative radial loads assumed by the various bearing pads including said pair of additional bearing pads having the radially fixed support surfaces.

6. The combination defined in claim 5 in which each said separate source of hydraulic pressure is a constant volume, positive displacement piston pump.

7. The combination defined in claim 5 in which the separate source of hydraulic pressure corresponding to each of the respective bearing pads is provided by a single multi-cylinder pump of the type in which each cylinder of the pump is substantially hydraulically independent of the other cylinders of the pump, and in which each cylinder of the pump is hydraulically connected to a different corresponding interface between a corresponding bearing pad and said journal.

8. In combination, a journal bearing adapted to support a journal for rotation and comprising an odd number of bearing pads in excess of two spaced apart from each other circumferentially of the journal being supported and lying beneath the circumference of the journal, each of said bearing pads being adapted to pivot on a corresponding support surface lying radially outwardly of the respective bearing pads, one of said bearing pads being located substantially centrally of the circumferential span of the plurality of bearing pads and lying substantially in alignment with the vertical axis of symmetry of the bearing, the support surface for said one bearing pad being radially adjustable, means for radially adjusting the support surface for said one bearing pad, said odd number of bearing pads including a pair of additional bearing pads respectively symmetrically positioned on opposite circumferential sides of said one bearing pad, the support surfaces for said additional bearing pads being radially fixed, said odd number of bearing pads including other bearing pads symmetrically positioned in circumferentially spaced relation to said additional bearing pads in a circumferential direction away from said one bearing pad, the support surfaces for said other bearing pads being radially adjustable, means for separately radially adjusting the support surfaces for said other bearing pads, a separate source of hydraulic pressure corresponding to each of the respective bearing pads and connected to the interface between the respective corresponding bearing pads and said journal, and separate hydraulic pressure gauge means for indicating the hydraulic pressure at each respective corresponding interface whereby to indicate the relative radial loads assumed by the various bearing pads including said pair of additional bearing pads.

9. The combination defined in claim 8 in which each said separate source of hydraulic pressure is a constant volume, positive displacement piston pump.

10. The combination defined in claim 8 in which the separate source of hydraulic pressure corresponding to each of the respective bearing pads is provided by a single multi-cylinder pump of the type in which each cylinder of the pump is substantially hydraulically independent of the other cylinders of the pump, and in which each cylinder of the pump is hydraulically connected to a different corresponding interface between a corresponding bearing pad and said journal.

* * * * *